(12) United States Patent
Gregory (10) Patent No.: US 6,522,826 B2
(45) Date of Patent: Feb. 18, 2003

(54) SYSTEM AND METHOD OF WINDING A FOG COIL

(75) Inventor: Peter Gregory, North Attleboro, MA (US)

(73) Assignee: Fibersense Technology Corporation, Canton, MA (US)

( * ) Notice: Subject to any disclaimer, the term of this patent is extended or adjusted under 35 U.S.C. 154(b) by 0 days.

(21) Appl. No.: 10/003,914

(22) Filed: Nov. 2, 2001

(65) Prior Publication Data

US 2002/0167673 A1 Nov. 14, 2002

Related U.S. Application Data

(60) Provisional application No. 60/290,046, filed on May 11, 2001.

(51) Int. Cl.[7] .............................. G02B 6/00; G01C 19/72
(52) U.S. Cl. ...................... 385/135; 385/134; 385/137; 356/465; 356/450
(58) Field of Search ................................. 385/134–137, 385/123, 147, 12, 11, 60; 356/465, 460, 73.1

(56) References Cited

U.S. PATENT DOCUMENTS

| | | | | |
|---|---|---|---|---|
| 5,168,539 A | * | 12/1992 | Negishi et al. ............. | 385/123 |
| 5,181,270 A | * | 1/1993 | Hsu et al. .................... | 385/134 |
| 5,220,632 A | | 6/1993 | LoStracco .................... | 385/134 |
| 5,245,687 A | * | 9/1993 | Usui ............................ | 385/134 |
| 5,481,358 A | | 1/1996 | Dyott et al. ................. | 356/460 |
| 5,923,807 A | | 7/1999 | Wild ........................... | 385/135 |
| 5,973,783 A | | 10/1999 | Goldner et al. ............. | 356/460 |
| 6,038,025 A | | 3/2000 | Weed ........................... | 356/460 |
| 6,137,940 A | | 10/2000 | Rageot ........................ | 385/134 |
| 6,349,166 B1 | * | 2/2002 | Kaliszek et al. ............. | 385/137 |

* cited by examiner

*Primary Examiner*—Phan T. H. Palmer
(74) *Attorney, Agent, or Firm*—McDermott, Will & Emery (57) ABSTRACT

An optical fiber coil assembly includes an optical fiber wound about an axis of rotation. A first section of the fiber, from the intermediate point to the first end, is wound around a bobbin in a first direction about the axis of rotation. A second section of the fiber, from the intermediate point to the second end, is wound, at least partially, around the bobbin in a second direction opposite the first direction. A reversal of the fiber, however, allows an end portion of the second section to be wound around the bobbin in the first direction, along with an end portion of the first section. The coil assembly further includes an epoxy zipper disposed between the first and second sections of the fiber, forming a fiber lead pair. An epoxy bridge disposed between the fiber lead pair and the bobbin secures the fiber lead pair to the bobbin.

49 Claims, 9 Drawing Sheets

SYSTEM AND METHOD OF WINDING A FOG COIL

CROSS-REFERENCE TO RELATED APPLICATIONS

This application claims the benefit of U.S. Provisional Application No. 60/290,046 entitled "SYSTEM AND METHOD OF WINDING A FOG COIL" filed on May 11, 2001, the disclosure of which is entirely incorporated herein by reference.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to fiber optic gyroscopes (hereinafter referred to as "FOG"), and more particularly, to FOG coils constructed and arranged to withstand severe environmental conditions such as those found in aerospace applications.

A FOG is used to measure the rate of rotation of a vehicle or other platform to which the FOG is attached. The FOG typically includes a coil of optical fiber disposed about an axis of rotation. A light source transmits light into each end of the optical fiber, so that two light transmissions propagate through the optical fiber in counter rotating directions. Detection circuitry receives the light transmissions as they emerge from the ends of the optical fiber and measures the relative phase relationship of the light. The phase relationship of the two light transmissions is related to the angular rotation of the FOG coil about the axis of rotation, and may be used to derive an output that is indicative of the rate of rotation of the FOG coil.

Often it is desirable to use a FOG in applications that encounter significant stresses due to acceleration, vibration, shock, extreme temperature variations, etc. Examples of such applications include aerospace platforms and space launch vehicles, among others. One disadvantage to prior art FOG configurations is that they typically exhibit adverse effects when subjected to forces near 50 g or greater, primarily due to force-induced deformations of the optical coil that affect the coil's propagation characteristics. In particular, tests have shown that the "pigtail" portion of a FOG is the component most susceptible to environmental stresses. To meet performance criteria of design specifications related to aerospace applications, a FOG would preferably be capable of withstanding forces well beyond 50 g.

It is an object of the present invention to substantially overcome the above-identified disadvantages and drawbacks of the prior art.

The following U.S. Patents provide additional background information related to the present invention.

U.S. Pat. No. 6,137,940, Reel of optical fiber, assigned to Alcatel corporation of Paris France, describes a reel of optical fiber comprising a supporting former and a coil made up of a plurality of superposed layers of touching turns of an optical fiber, a link layer made of a flexible material being disposed directly on the supporting former between said former and said coil, wherein an intermediate support made up of a winding of a plurality of layers of the same optical fiber as that of said coil, and wound in the same way, but with the turns glued together with a glue having strong adhesive power, is further situated between said coil and said flexible link layer.

U.S. Pat. No. 6,038,025, Method for manufacturing of fiber optic gyroscopes by providing a flexible connector connected to the coil and remaining gyroscope elements, assigned to Honeywell Inc. (Minneapolis, Minn.) describes a method for fabricating a fiber optic gyroscope and the fiber optic gyroscope produced thereby are disclosed. The method and apparatus are characterized in that optical coils are connected to a substantially rigid member through flexible connectors, thereby enabling a modular unit with increased mobility and accessibility. Multiple assemblies may be arranged to enable the formation of multi-axis fiber optic rotation rate sensors U.S. Pat. No. 5,973,783, An improved dressing for the fiber optic leads of a fiber optic gyroscope sensing coil and method for forming the same, assigned to Litton Systems, Inc. (Woodland Hills, Calif.) describes a pair of fiber optic leads connecting the sensing coil of a rotation sensing device to an integrated optics chip. The fiber optic leads are originally arranged to extend around the fiber optic sensing coil in different directions. The leads are formed of unequal lengths, where the longer of the leads is extended along an outer circumference of the sensing coil. The longer lead is bent so that the circumferential direction of longer lead reverses itself, and the longer lead then extends around the sensing coil in the same direction as the shorter lead. A low modulus adhesive is applied to the leads and cured to initially bond the leads in place against the sensing coil. The pair of leads is then wound in the same circumferential direction adjacent to each other fashion around the outer circumference of the sensing coil. After the desired amount of winding has been completed, a predetermined length of each of the leads is left available to be routed to the rotation sensing device. The entire outer surface of the wound fiber optic leads surrounding the temporary adhesion is then coated with a low modulus adhesive and cured to bond the wound leads against the sensing coil structure.

U.S. Pat. No. 5,923,807, Storage Apparatus for Optical Fiber, assigned to Lucent Technologies Inc. (Murray Hill, N.J.) describes an optical fiber buffer loop management system which may be incorporated into a conventional interconnection box and which comprises one or more spools or pins around which optical fiber buffer loops are loosely dressed. Strategically placed cover guards forming narrow insertion slots for the fibers are attached to the tops of the spools or pins to prevent the fibers from unraveling. By loosely dressing the fiber loops in the interconnection box, no excess slack exists in the portion of the loop running from the spool to the point at which the plug connector on the end of the buffer loop is connected to the coupling located inside of the interconnection box. Preferably, each of the buffer loops is loosely wrapped about two spools in a figure-of-eight configuration, which allows a buffer loop density approximately four times greater than that of the prior art systems to be achieved without bending the fibers beyond their minimum bend radii. By loosely retaining the buffer loops in the interconnection box, as opposed to wrapping them tautly, the buffer loops can be easily unraveled when repairs are to be made. The present invention also provides a method for replacing faulty plug connectors. In order to replace a faulty plug connector, the plug connector is removed from the coupling device in the interconnection box and the optical fiber is cut so as to separate the plug connector from the optical fiber. The optical fiber is then removed from around the spool or spools and a new plug connector is then secured to the optical fiber. The new plug connector is then connected to the coupling device. The buffer loop is then wrapped about the spools in a figure-of-eight configuration as discussed above.

U.S. Pat. No. 5,481,358, Coil mounting arrangement for fiber optic gyroscope using a gel loaded with particles, assigned to Andrews Corporation (Orland Park, Ill.), describes the sensing coil of a fiber optic gyroscope is wholly or partially surrounded by a gel. The components attached to the coil, such as the directional coupler(s) and polarizer, may also be wholly or partially submerged in the gel. The gel is contained by a rigid housing, in which the inner walls of the housing form a cavity for the coil and the gel. The cavity is filled with the gel, and the gel may be bonded to the inner walls of the housing. The gel remains stiff enough to maintain the coil in a fixed position relative to the housing, and soft enough to avoid any significant effect on the h of the coil over the operating temperature range. Furthermore, the gel can be loaded with particles to adjust the specific gravity of the gel, to modify the thermal properties of the gel and to increase the viscosity of the gel for improved vibration damping. In a modified form, the optical-fiber sensing coil is positioned on a mounting surface and otherwise surrounded by the gel. Alternatively, the optical fiber sensing coil is wound around a form that has a layer of gel on the coil-supporting surface.

U.S. Pat. No. 5,220,632, A method for preparing an optical fiber canister, assigned to Hughes Aircraft Company, Los Angeles, Calif. includes providing a length of a wire having a diameter of about that of the optical fiber, and winding the wire onto a mandrel in a preselected winding pattern to form a base layer. A replicating strip having a flexible substrate with a patterning layer of b-staged epoxy on one side thereof is provided, and the patterning layer is pressed against the base layer to form a groove pattern in the patterning layer. The b-staged epoxy layer is cured to harden it to preserve the groove pattern, and then the flexible substrate is applied to an optical fiber bobbin with the grooved patterning layer facing outwardly. An optical fiber is wound into the groove of the patterning layer to form an optical fiber pack.

SUMMARY OF THE INVENTION

One aspect of the invention comprises an optical fiber coil assembly for use in a fiber optic gyroscope, including a bobbin disposed about a longitudinal axis. The longitudinal axis is an axis of rotation about which the bobbin revolves. The coil assembly also includes an optical fiber having a first end and a second end, and further characterized by an intermediate point between the first end and the second end. A first section of the optical coil defined from the intermediate point to the first end is wound around the bobbin in a first rotational direction about the axis of rotation. A second section of the optical coil is defined from the intermediate point to the second end, and at least a portion of the second section is wound around the bobbin in a second rotational direction opposite of the first rotational direction. The coil assembly also includes a reversal of the optical fiber in the second section, such that an end portion of the second section, from the reversal to the second end, is wound around the bobbin in the first direction, along with an end portion of the first section. The coil assembly further includes an epoxy zipper disposed between at least a portion of the first section and the second section of the optical fiber, so as to join the first section and the second section of the optical fiber to form a fiber lead pair. The coil assembly also includes an epoxy bridge disposed between at least a portion of the fiber lead pair and the bobbin, so as to secure the fiber lead pair to the bobbin.

Another embodiment of the invention further includes an integrated optics circuit rotatably mounted to an end of the bobbin, such that the integrated optics circuit rotates about the axis of rotation. The first end and the second end of the optical fiber is fixedly attached and optically coupled to the integrated optics circuit.

Another embodiment of the invention further includes one or more layers of wound fiber, each of the layers being substantially parallel to the axis of rotation, and an epoxy layer disposed upon the outer portion of each of the one or more layer of wound fiber.

In another embodiment of the invention, a group of individual optical fibers are constructed and arranged such that a cross section of the one or more layers of wound fiber are disposed in a hexagonal arrangement.

Another embodiment of the invention further includes an epoxy layer disposed between a first layer of the one or more layers of wound fiber and the bobbin.

In another embodiment of the invention, the epoxy layer includes a high-modulus epoxy.

In another embodiment of the invention, the epoxy zipper extends along the fiber lead pair from the ends of the fiber to the reversal.

In another embodiment of the invention, the reversal is positioned within the fiber such that the end portion of the first section is substantially equal to the end portion of the second section.

In another embodiment of the invention, the epoxy zipper is disposed along opposite sides of the first section and the second section of the optical fiber, such that the first section and the second section of the optical fiber are substantially adjacent.

In another embodiment of the invention, the epoxy zipper is disposed between the first section and the second section of the optical fiber, such that the zipper maintains the first section and the second section of the optical fiber at a fixed distance from one another along the length of the fiber lead pair.

In another embodiment of the invention, the epoxy zipper encapsulates the first section and the second section of the optical fiber and fixedly maintains the first section and the second section with respect to one another along the length of the fiber lead pair.

In another aspect, the invention comprises an optical fiber coil assembly for use in a fiber optic gyroscope, including a bobbin disposed about a longitudinal axis. The longitudinal axis is an axis of rotation about which the bobbin revolvees. The coil assembly also includes an optical fiber having a first end and a second end. The fiber is characterized by an intermediate point between the first end and the second end. A first section of the optical coil defined from the intermediate point to the first end is wound around the bobbin in a first rotational direction about the axis of rotation. A second section of the optical coil defined from the intermediate point to the second end is wound, at least partially, around the bobbin in a second rotational direction opposite of the first rotational direction. The coil assembly further includes an epoxy zipper disposed between at least a portion of the first section and the second section of the optical fiber, so as to join the first section and the second section of the optical fiber to form a fiber lead pair. The coil assembly also includes an epoxy bridge disposed between at least a portion of the fiber lead pair and the bobbin, so as to secure the fiber lead pair to the bobbin.

In another aspect, the invention comprises an optical fiber coil assembly for use in a fiber optic gyroscope, including a bobbin, disposed about a longitudinal axis. The longitudinal axis is an axis of rotation about which the bobbin revolves. The coil assembly further includes an optical fiber having a first end and a second end. The fiber is characterized by an intermediate point between the first end and the second end. A first section of the optical coil defined from the intermediate point to the first end is wound around the bobbin in a first rotational direction about the axis of rotation. A second section of the optical coil defined from the intermediate point to the second end is at least partially wound around the bobbin in a second rotational direction opposite of the first rotational direction. The coil assembly further includes an integrated optics circuit rotatably mounted to an end of the bobbin, such that the integrated optics circuit rotates about the axis of rotation. The first end and the second end of the optical fiber is fixedly attached and optically coupled to the integrated optics circuit.

In another aspect, the invention comprises an optical fiber coil assembly for use in a fiber optic gyroscope, including a bobbin disposed about a longitudinal axis. The longitudinal axis is an axis of rotation about which the bobbin revolves. The coil assembly further includes an optical fiber having a first end and a second end. The optical fiber is characterized by an intermediate point between the first end and the second end. A first section of the optical coil defined from the intermediate point to the first end is wound around the bobbin in a first rotational direction about the axis of rotation. A second section of the optical coil defined from the intermediate point to the second end is wound, at least partially, around the bobbin in a second rotational direction opposite of the first rotational direction. The coil assembly further includes an epoxy zipper disposed between at least a portion of the first section and the second section of the optical fiber, so as to join the first section and the second section of the optical fiber to form a fiber lead pair.

In another aspect, the invention comprises an optical fiber coil assembly for use in a fiber optic gyroscope, including a bobbin disposed about a longitudinal axis. The longitudinal axis is an axis of rotation about which the bobbin revolves and the coil assembly further includes an optical fiber having a first end and a second end. The optical fiber is characterized by an intermediate point between the first end and the second end. A first section of the optical coil defined from the intermediate point to the first end is wound around the bobbin in a first rotational direction about the axis of rotation. A second section of the optical coil defined from the intermediate point to the second end is wound, at least partially, around the bobbin in a second rotational direction opposite of the first rotational direction. The coil assembly further includes a reversal of the optical fiber in the second section, such that an end portion of the second section, from the reversal to the second end, is wound around the bobbin in the first direction, along with an end portion of the first section. The coil assembly also includes an epoxy zipper disposed between at least a portion of the first section and the second section of the optical fiber, so as to join the first section and the second section of the optical fiber to form a fiber lead pair. The coil assembly also includes an epoxy bridge disposed between at least a portion of the fiber lead pair and the bobbin, so as to secure the fiber lead pair to the bobbin. The coil assembly further includes an integrated optics circuit rotatably mounted to an end of the bobbin, so that the optics circuit rotates about the axis of rotation. The first end and the second end of the optical fiber is fixedly attached and optically coupled to the integrated optics circuit. The optical fiber is constructed and arranged as one or more layers of wound fiber, each of the layers being substantially parallel to the axis of rotation, and an epoxy layer is disposed upon the outer portion of each of the one or more layer of wound fiber.

In another aspect, the invention comprises a method of constructing an optical fiber coil assembly for use in a fiber optic gyroscope. The method includes winding an optical fiber about a bobbin, beginning at an intermediate point on the fiber between a first end and a second end. A first section of the optical fiber is defined from the intermediate point to the first end. This first section of the coil is wound around the bobbin in a first rotational direction about the axis of rotation. A second section of the optical coil defined from the intermediate point to the second end. This second section is wound, at least partially, around the bobbin in a second rotational direction opposite of the first rotational direction. The optical fiber is constructed and arranged as one or more layers of wound fiber, and each of the layers is substantially parallel to the axis of rotation. An epoxy layer is disposed upon the outer portion of each of the one or more layer of wound fiber. The method also includes providing a reversal of the optical fiber in the second section, such that an end portion of the second section, from the reversal to the second end, is wound around the bobbin in the first direction, along with an end portion of the first section. The method further includes applying an epoxy zipper disposed between at least a portion of the first section and the second section of the optical fiber, so as to join the first section and the second section of the optical fiber to form a fiber lead pair. The method also includes applying an epoxy bridge disposed between at least a portion of the fiber lead pair and the bobbin, so as to secure the fiber lead pair to the bobbin. The method further includes rotatably mounting an integrated optics circuit to an end of the bobbin, such that the integrated optics circuit rotates about the axis of rotation. The first end and the second end of the optical fiber is fixedly attached and optically coupled to the integrated optics circuit.

In another aspect, the invention comprises a method of constructing an optical fiber coil assembly for use in a fiber optic gyroscope. The method includes winding an optical fiber about a bobbin, beginning at an intermediate point on the fiber between a first end and a second end. A first section of the optical fiber is defined from the intermediate point to the first end. This first section of the coil is wound around the bobbin in a first rotational direction about the axis of rotation. A second section of the optical coil defined from the intermediate point to the second end. This second section is wound, at least partially, around the bobbin in a second rotational direction opposite of the first rotational direction. The optical fiber is constructed and arranged as one or more layers of wound fiber, and each of the layers is substantially parallel to the axis of rotation. An epoxy layer is disposed upon the outer portion of each of the one or more layer of wound fiber. The method also includes applying an epoxy zipper disposed between at least a portion of the first section and the second section of the optical fiber, so as to join the first section and the second section of the optical fiber to form a fiber lead pair.

In another embodiment, the method further includes applying an epoxy bridge disposed between at least a portion of the fiber lead pair and the bobbin, so as to secure the fiber lead pair to the bobbin.

In another embodiment, the method further includes rotatably mounting an integrated optics circuit to an end of the bobbin, such that the integrated optics circuit rotates about the axis of rotation. The first end and the second end of the optical fiber is fixedly attached and optically coupled to the integrated optics circuit.

In another embodiment, the method further includes providing a reversal of the optical fiber in the second section, such that an end portion of the second section, from the reversal to the second end, is wound around the bobbin in the first direction, along with an end portion of the first section.

In another aspect, the invention comprises an optical fiber coil assembly for use in a fiber optic gyroscope. The coil assembly includes an optical fiber having a first end and a second end, and is characterized by an intermediate point between the first end and the second end. A first section of the optical coil is defined from the intermediate point to the first end, and a second section is defined from the intermediate point to the first end. The first section is wound around a bobbin in a first rotational direction about the axis of rotation, and the second section is wound around the bobbin in a second rotational direction opposite of the first rotational direction. The coil assembly further includes means for reversing the optical fiber in the second section, such that an end portion of the second section, from the reversal to the second end, is wound around the bobbin in the first direction, along with an end portion of the first section. The coil assembly also includes means for joining the first section and the second section of the optical fiber to form a fiber lead pair, and means for bridging at least a portion of the fiber lead pair with respect to the bobbin, so as to secure the fiber lead pair to the bobbin.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

The disclosure relates to a fiber-optic gyroscope system and method of wrapping the pigtails of the fiber-optic gyroscope. A pigtail is the end of a strand of optical fiber used to make an optical connection with a circuit element. The overall FOG system is shown, as well as key subsystem components and their interconnections. Pigtail wrapping, tightening, and other integration subsystem details are shown that result in the ability of the FOG assembly to withstand up to 200 g.

Figure 1:
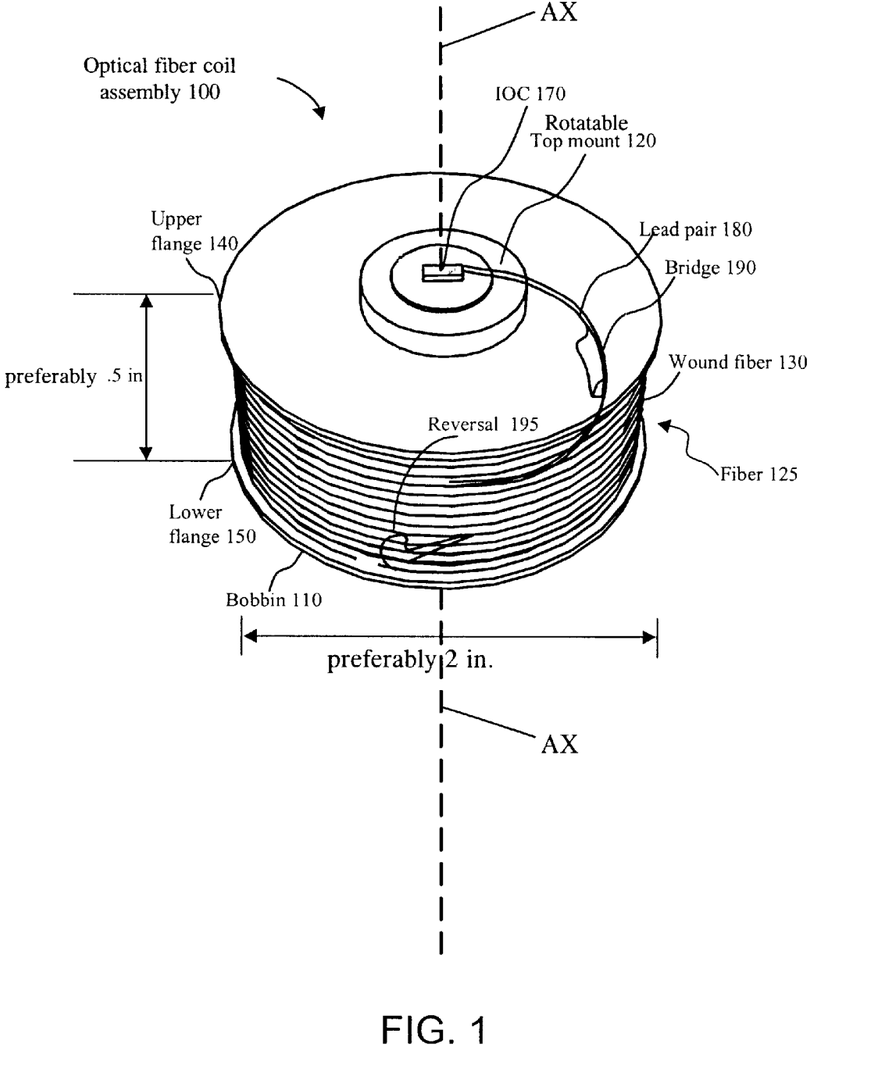
FIG. 1 shows a perspective view of one embodiment of an optical fiber coil assembly according to the present invention.

FIG. 1 shows a perspective view of one embodiment of a optical fiber coil assembly 100 for use in a fiber optic gyroscope (FOG) assembly, including a bobbin 110, a rotatable top mount 120, an optical fiber 125, an integrated optical circuit (IOC) 170, and a bridge 190.

The bobbin 110 is cylindrically shaped with an upper flange 140 and a lower flange 150 disposed on opposite ends of bobbin 110 as shown in FIG. 1. The upper flange 140 and the lower flange 150 are disc-shaped, each characterized by two flat, parallel surfaces. The bobbin 110 is symmetrically disposed about a principal axis AX that is perpendicular to the flat surfaces of the upper flange 140 and the lower flange 150. The bobbin 110 is preferably constructed from graphite-epoxy composite with a low thermal coefficient of expansion that closely matches that of the wound fiber 130. In other embodiments, the bobbin 110 maybe constructed from other materials known in the art to have similar thermal expansion characteristics. The bobbin 110 forms a circular housing for wound fiber 130, such that the upper flange 140 and the lower flange 150 overhang wound fiber 130, as shown in the FIG. 1. Bobbin 110 is mechanically affixed to rotatable top mount 120 and bottom mount (not shown). Top mount 120 is rotatably attached to the bobbin in a way that allows rotation of the top mount 120 about the principle axis AX.

The optical fiber 125 includes a single strand of polarization-maintaining optical fiber, winds about the principal axis of the bobbin 110, forming a plurality of layers of wound fiber 130. The fiber 125 further includes a fiber lead pair 180. Lead pair 180 connects to IOC 170 (as described, for example, in related U.S. application Ser. No. 10/120,745 filed Apr. 11, 2002, entitled Method of Aligning Optical Fibers to an IOC), which is connected to rotatable top mount 120, thus allowing free rotation of IOC 170. IOC 170 is an Integrated Optical Circuit, constructed from miniaturized solid-state optical components on a lithium niobate (LiNbO3) substrate, that performs the functions of modulator and splitter. In other embodiments, the IOC 170 may include other suitable semiconductor or dielectric substrates known in the art for supporting the modulator and splitter functions.

A bridge 190 is formed using epoxy such as Norland brand U-V curable epoxy or other similar epoxies known in the art, and serves to attach lead pair 180 to upper flange 140.

Preferably, opposite ends of a strand of optical fiber 125 wind in counter-rotating directions about bobbin 110. One of the two emerging ends of optical fiber 125 is looped into a reversal 195 as shown in FIG. 1 (and described in more detail herein), and disposed to wrap back upon its opposite end. The two ends of optical fiber 125 thus wind as a pair back around the bobbin 110 until crossing the upper flange 140, bridge 190, and into IOC 170 as fiber lead pair 180.

In operation, a wavelength light source (not shown—part of the complete FOG assembly) driven at a constant power emits light of constant wavelength. This light propagates through an optical fiber (not shown) that connects to one end of IOC 170. IOC 170 includes a waveguide shaped in a Y-configuration, with the two-port side connecting to both ends of optical fiber 125 wound as a coil onto bobbin 110.

Light from the light source is split within IOC 170 to form two light signals, and travels bi-directionally through wound fiber 130. The light signals return through IOC 170 where they are combined, and pass through a coupler (not shown) that diverts a portion of the combined light to a detecting element (not shown).

While the optical fiber coil assembly 100 remains stationary, light traveling in both clockwise and counter clockwise directions through wound fiber 130 coil traverse the same distance, and the emerging waves incident upon the detector are in phase. If the coil of wound fiber 130 rotates about the principal axis of bobbin 110 (i.e., such that the axis AX is the axis of rotation of the coil assembly 100), light traveling in the direction opposite to the coil rotation does not travel as far as the light traveling in the other direction before exiting the coil of wound fiber 130. This effective path length difference results in a phase shift between the two emerging waves. The phase shift is proportional to the rate of rotation of wound fiber 130, and is a consequence of the speed of light being constant. This phase shift is observed as an interference pattern by the detecting element, and converted into a signal indicative of the rate of rotation, i.e., that contains information about the motion of the system in the plane of wound fiber 130, and is translated into the gyroscope's output.

Figure 2:
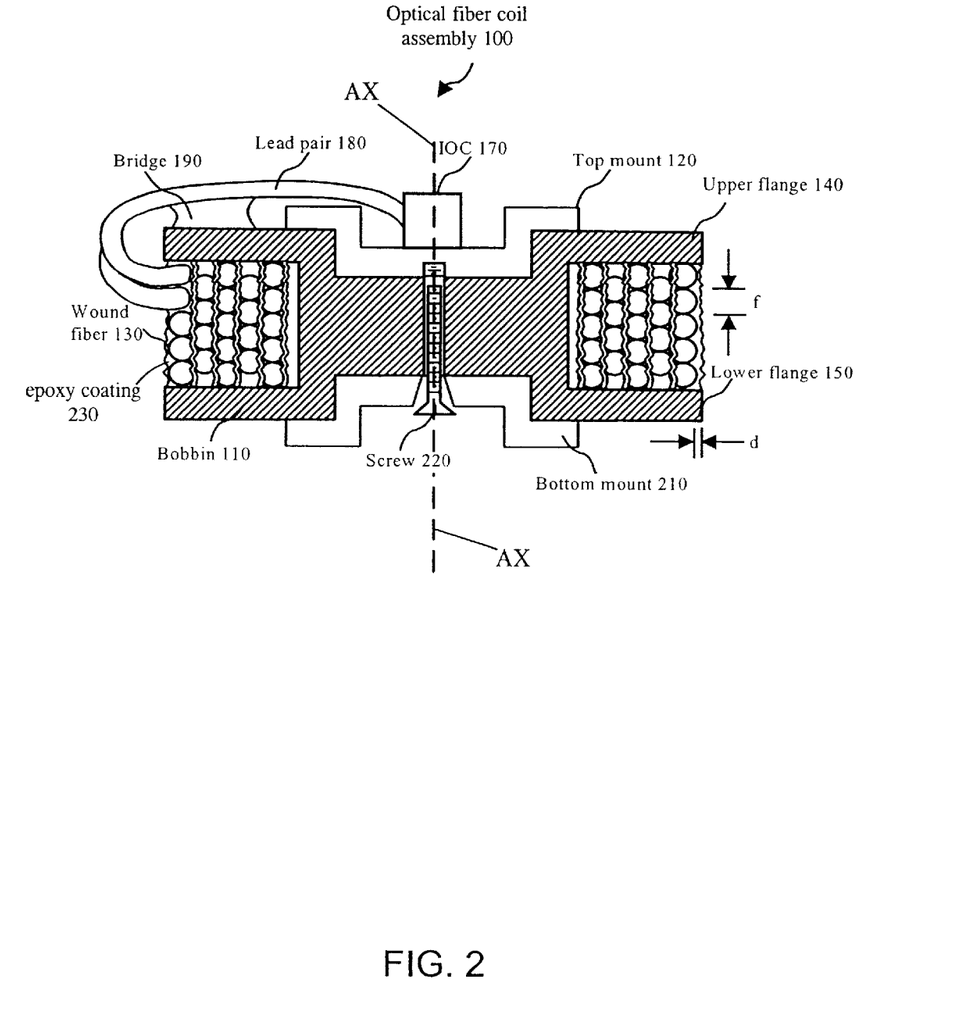
FIG. 2 shows a cross sectional view of the optical fiber coil assembly of FIG. 1.

FIG. 2 shows a cross sectional view of the optical fiber coil assembly 100. In addition to the elements shown in FIG. 1, assembly 100 further includes a screw 220, a bottom mount 210, and an epoxy coating 230.

The screw 220 is inserted through bottom mount 210 and secured to top mount 120, as shown in FIG. 2, to retain bobbin 110. Epoxy coating 230 is a conventional high modulus epoxy, e.g., Epoxy Technology's Epotek 330 (although other similar high modulus epoxies known in the art may also be used). The epoxy coating 230 is applied to the outer portion of each layer of wound fiber 130 as it is wound to secure wound fiber 130 and to prevent slippage. In some embodiments, an epoxy coating 230 may also be applied between the first layer of wound fiber 130 and the bobbin. The use of such a high modulus epoxy is important to reducing sensitivity to vibration-induced noise. Those skilled in the art can readily perceive that screw 220 can be replaced by other suitable fastening mechanisms known in the art, such as epoxy, rivets, etc.

In operation, referring to FIG. 1 and FIG. 2, optical fiber 125 is wound around bobbin 110 in a precise manner starting preferably in the middle of its length and wrapping its two ends in opposite directions. In other embodiments, the fiber 125 may be wound around the bobbin 110 starting anywhere between the two ends; however, the winding is substantially symmetrical when the winding starts in the middle of the length of the fiber 125, and thus is preferable. As the rows of optical fiber 125 are wound onto bobbin 110, the cross-section of wound fiber 130 forms a hexagonal close-packed arrangement as shown in FIG. 2. This packing arrangement is crucial to the resilience and proper functioning of the assembly in that it substantially prevents wound fiber 130 from slipping in a direction parallel to the principal axis AX of bobbin 110. This packing arrangement also disallows any crossover between ends of wound fiber 130. As noted above, the thin epoxy coating 230 is deposited on each layer of wound fiber 130 and adds farther stability to the packing arrangement. The optical fiber 125 has a diameter f and is wound until bobbin 110 is fill, except for a distance d on upper flange 140 and lower flange 150. A typical value for f is 165 microns, although other fiber diameters may also be used. The value of d can vary widely depending upon the application, although values of d typically range from 1 to 5 millimeters.

In other embodiments, the optical fiber 125 maybe wound onto the bobbin 110 dry, and a vacuum may be employed to draw epoxy throughout the bobbin to secure the wound fiber 130 in place. The vacuum and the technique employed to draw epoxy throughout wound fiber 130 are well known to those skilled in the art.

Figure 3:
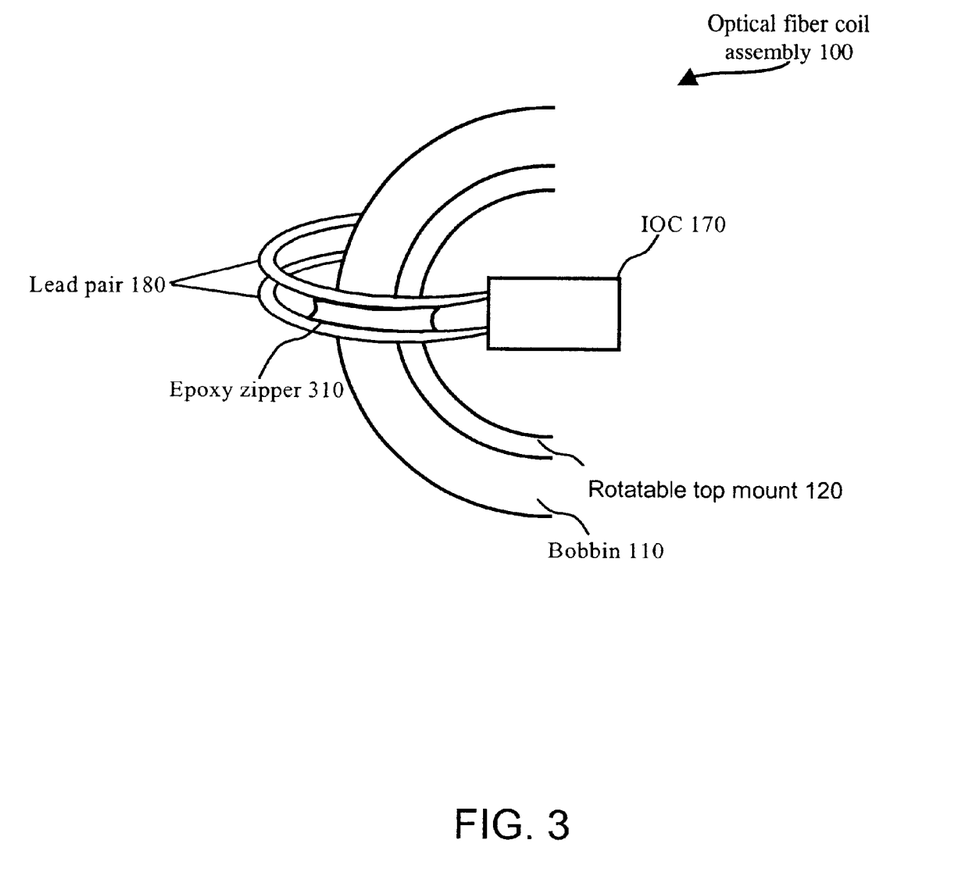
FIG. 3 shows the top view of a portion of optical fiber coil assembly of FIG. 1, including an epoxy zipper.

FIG. 3 shows the top view of a portion of optical fiber coil assembly 100, including an epoxy zipper 310. The epoxy zipper 310 is formed when epoxy (e.g. Norland's brand U-V curable epoxy, although other similar epoxies known in the art may also be used) is applied between the two optical fiber 125 ends comprising fiber lead pair 180. In other embodiments, the epoxy zipper 310 may partially or completely encapsulate the two optical fiber 125 ends comprising the lead pair 180.

Lead pair 180 preferably wraps over the top of bobbin 110 (FIG. 2) and is secured to upper flange 140 by epoxy bridge 190 along the length of the lead pair 180, toward IOC 170. The epoxy zipper 310 is preferably applied between lead pair 180 using the same epoxy as that which composes bridge 190, e.g. Norland's brand U-V curable epoxy. Epoxy zipper 310 ensures that both ends of optical fiber 125 in lead pair 180 are stationary with respect to one another, as any relative movement between the two ends of fiber 125 may result in the FOG assembly 100 yielding erroneous data.

Figure 4:
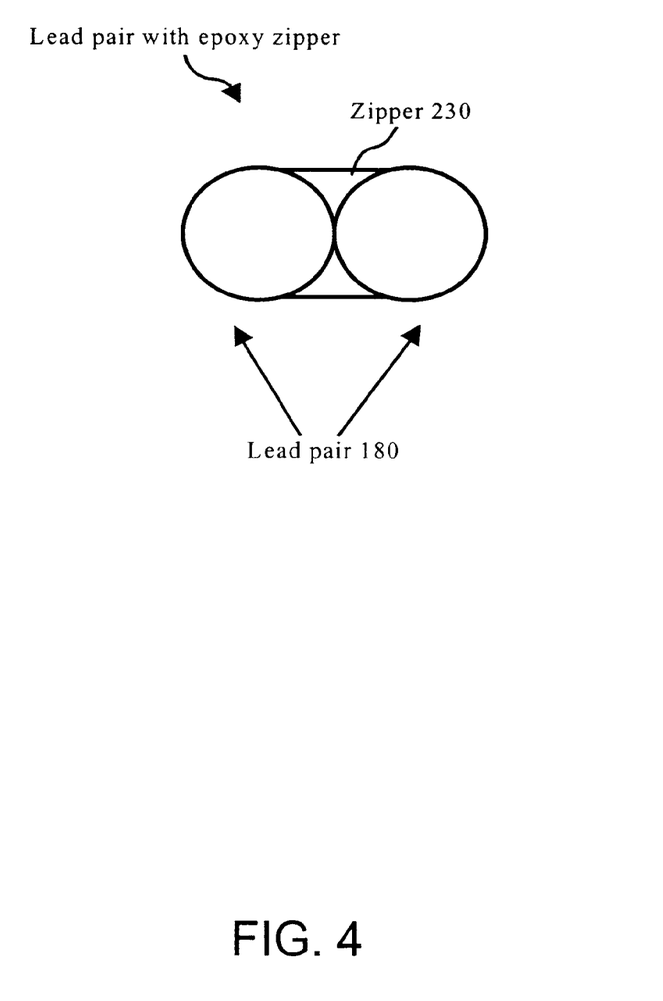
FIG. 4 is a cross sectional view of lead pair of FIG. 1, showing epoxy zipper.

FIG. 4 is a cross sectional view of lead pair 180, showing epoxy zipper 310. Epoxy zipper 310 secures lead pair 180 together as lead pair 180 emerges above upper flange 140 and connects to IOC 170. The epoxy used to form epoxy zipper 310 is preferably applied between lead pair 180 using conventional methods, affording the FOG assembly 100 a more rigid quality and ensuring that the optical fiber 125 ends comprising lead pair 180 undergo no movement relative to one another. It is preferable to keep the optical fiber ends of lead pair 180 as close together as possible. In one preferred embodiment, as shown in FIG. 4, the fiber ends of the lead pair 180 are adjacent, and the epoxy zipper 310 fills in the regions on either side of the contact point. In other embodiments, the zipper may further occupy a space between the fiber ends, so that the fiber ends are separated by a gap. In yet another embodiment, the zipper 310 may completely encapsulate the fiber ends, with or without a gap between the fiber ends. Each zipper configuration may provide different rigidity characteristics between the fiber ends, and different distances between the fiber ends. The particular zipper configuration used is a design choice that depends on the particular application for which the FOG assembly 100 will be incorporated.

Figure 5:
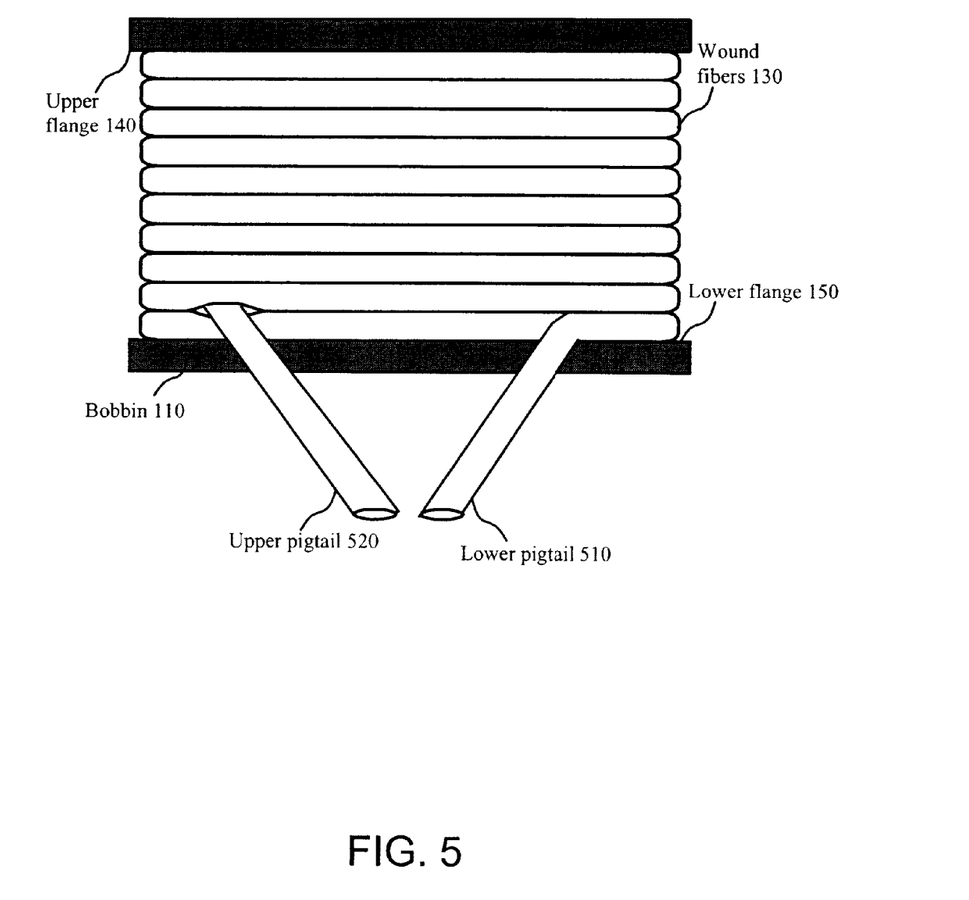
FIG. 5 shows a side view of a portion of optical fiber coil assembly of FIG. 1, including an upper pigtail 520 and a lower pigtail.

FIG. 5 shows a side view of a portion of optical fiber coil assembly 100 of FIG. 1, and includes an upper pigtail 520 and a lower pigtail 510. The optical fiber 125 is wrapped onto bobbin 110 outward from the center so that its two opposite ends emerge from wound fibers 130 near the bottom of bobbin 110, as shown in FIG. 5. Each emerging end of optical fiber 125 is referred to herein as a "pigtail." Lower pigtail 510 emerges from the lower portion of bobbin 110 and upper pigtail 520 emerges from the underlying layer of wound fiber 130.

As shown in FIG. 5, lower pigtail 510 and upper pigtail 520 emerge from bobbin 110 and the two are cut to specific lengths, typically one to three meters in length. The total length of optical fiber 125 forming the connections to the two optical-input side of IOC 170 determines the eigenfrequency of the FOG assembly and thus trimming the pigtails affects the eigenfrequency of FOG assembly.

Figure 6:
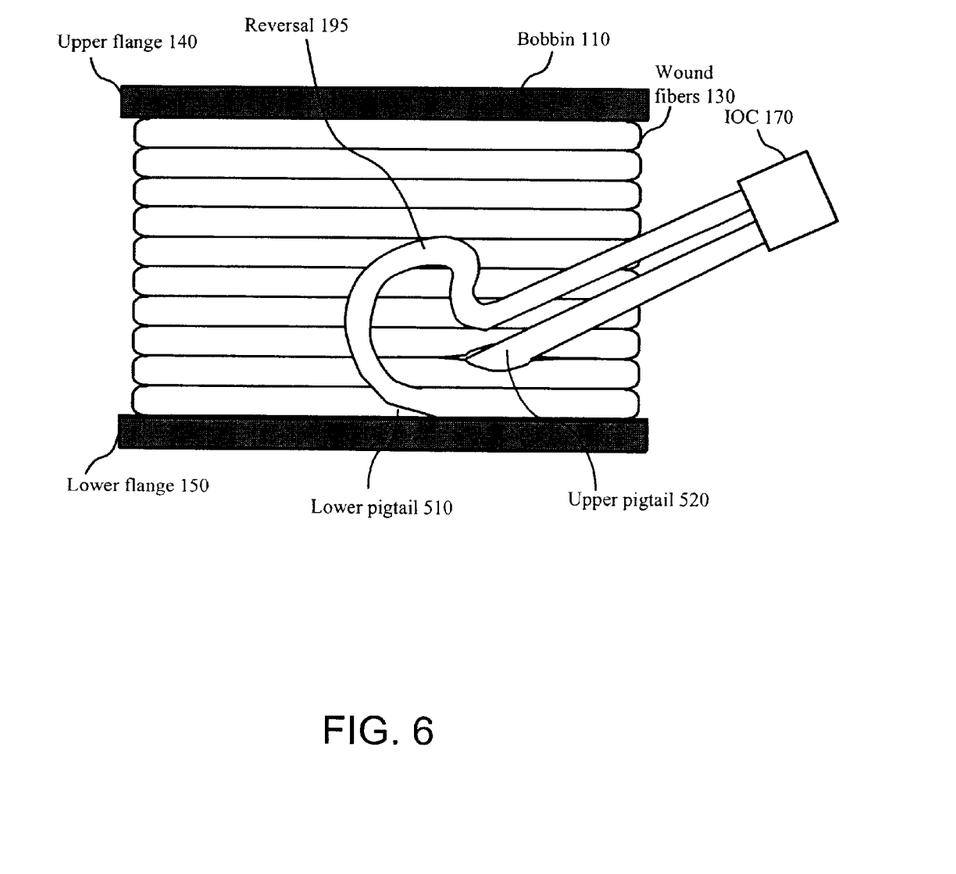
FIG. 6 shows a side view of a portion of optical fiber coil assembly of FIG. 1, illustrating the pigtail reversal.

FIG. 6 shows a side view of a portion of optical fiber coil assembly 100 illustrating pigtail reversal 195. The lower pigtail 510 emerging near the bottom of bobbin 110 is formed into a loop, referred to herein as a reversal 195. Following the reversal 195, the lower pigtail 510 falls back upon upper pigtail 520, and the two pigtails proceed in parallel as a lead pair 180, until ending in a connection to IOC 170. The reversal 195 is spot-tacked to the wound fibers 130 using, for example, Norland brand UV curable epoxy to hold reversal 195 in place.

Reversal 195 is positioned to ensure that the ends of the optical fiber 125 comprising lead pair 180 are exactly equal in length between the point of entrance into IOC 170 and the point at which they are joined after the formation of reversal 195. This positioning serves to maintain a close proximity between the pigtails and facilitates a precise winding of the pigtails back onto bobbin 110.

Figure 7:
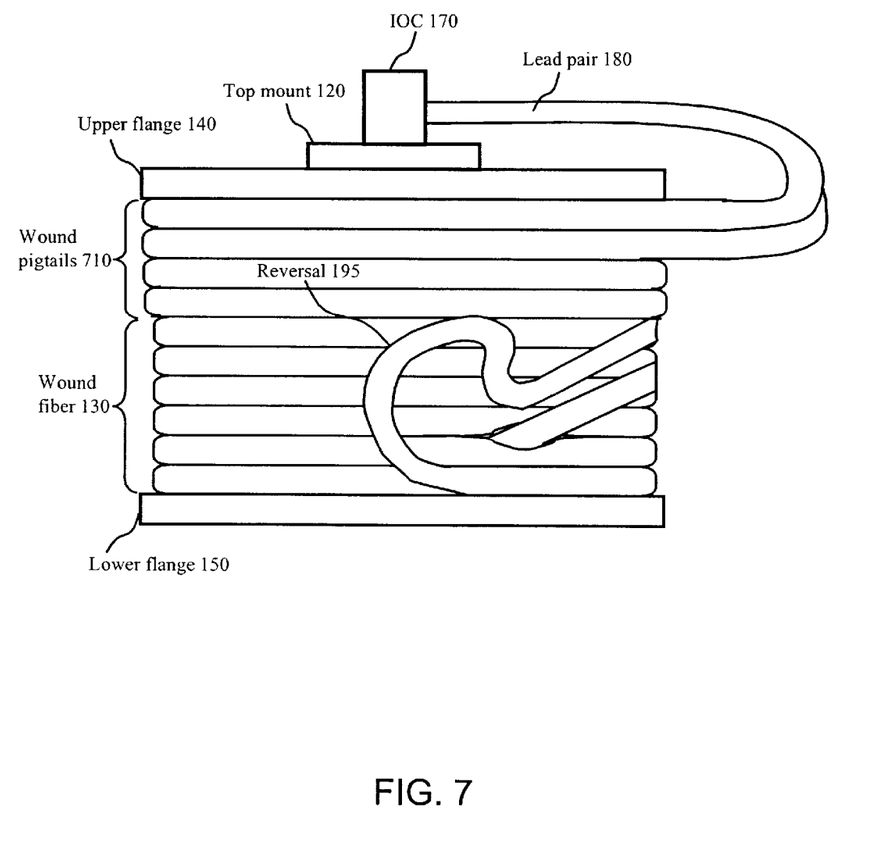
FIG. 7 shows a side view of a portion of optical fiber coil assembly of FIG. 1 before the final rotation of rotatable top mount.

FIG. 7 shows a side view of a portion of optical fiber coil assembly 100 before the final rotation of rotatable top mount 120 and includes wound pigtails 710. After upper pigtail 520 and lower pigtail 510 are connected to IOC 170, IOC 170 is mechanically attached to rotatable top mount 120, which is then attached to upper flange 140. Although the top mount in FIG. 1 is shown to be of a specific form, any suitable mounting fixture that may be rotatably mounted to the bobbin may also be used. At this point the two pigtails wind back onto bobbin 110 as a pair by holding IOC 170 stationary and rotating top mount 120. As the two pigtails wind back onto bobbin 110 they form a length of wound pigtails 710 on top of a portion of wound fiber 130 above the top of the loop formed in reversal 195. At this stage, there may be slack present in lead pair 180 as lead pair 180 enters IOC 170.

Figure 8:
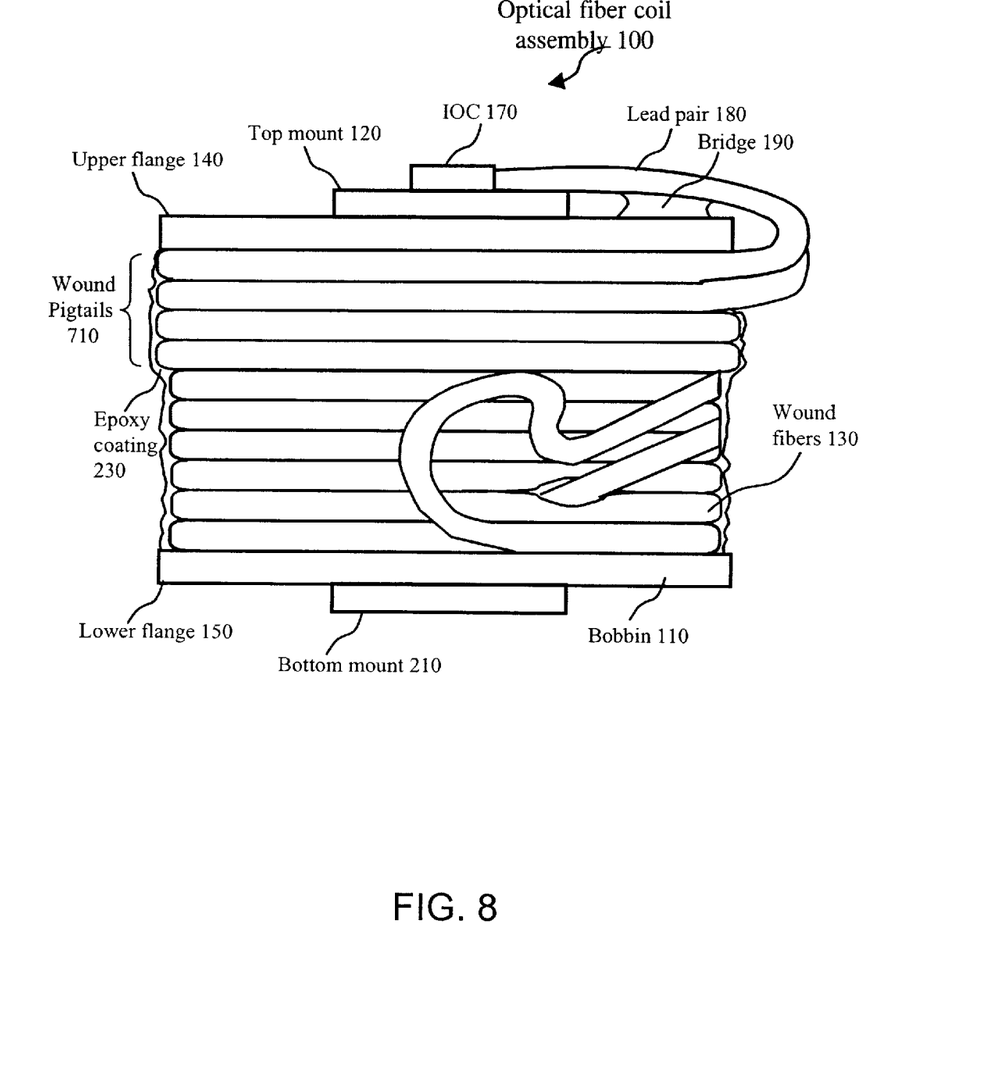
FIG. 8 shows a side view of the completed coil assembly of FIG. 1.

The completed optical fiber coil assembly 100, shown in FIG. 8, is a single rigid structure with no element free to vibrate. A final coating of epoxy (e.g. Epotek 330) is applied to the exposed portion of wound fiber 130 and reversal 195 to further increase the stability of optical fiber coil assembly 100. IOC 170 rests upon rotatable top mount 120 and facilitates the removal of any slack in lead pair 180. Upon removal of slack, lead pair 180 is spot-tacked to upper flange 140 with epoxy bridge 190, and the rotatable top mount 120 is secured via screw 220 to prevent loosening during operation. Other methods of securing the top mount known in the art (e.g., gluing, soldering, or via alternate mechanisms similar to a screw) may also be used.

Figure 9:
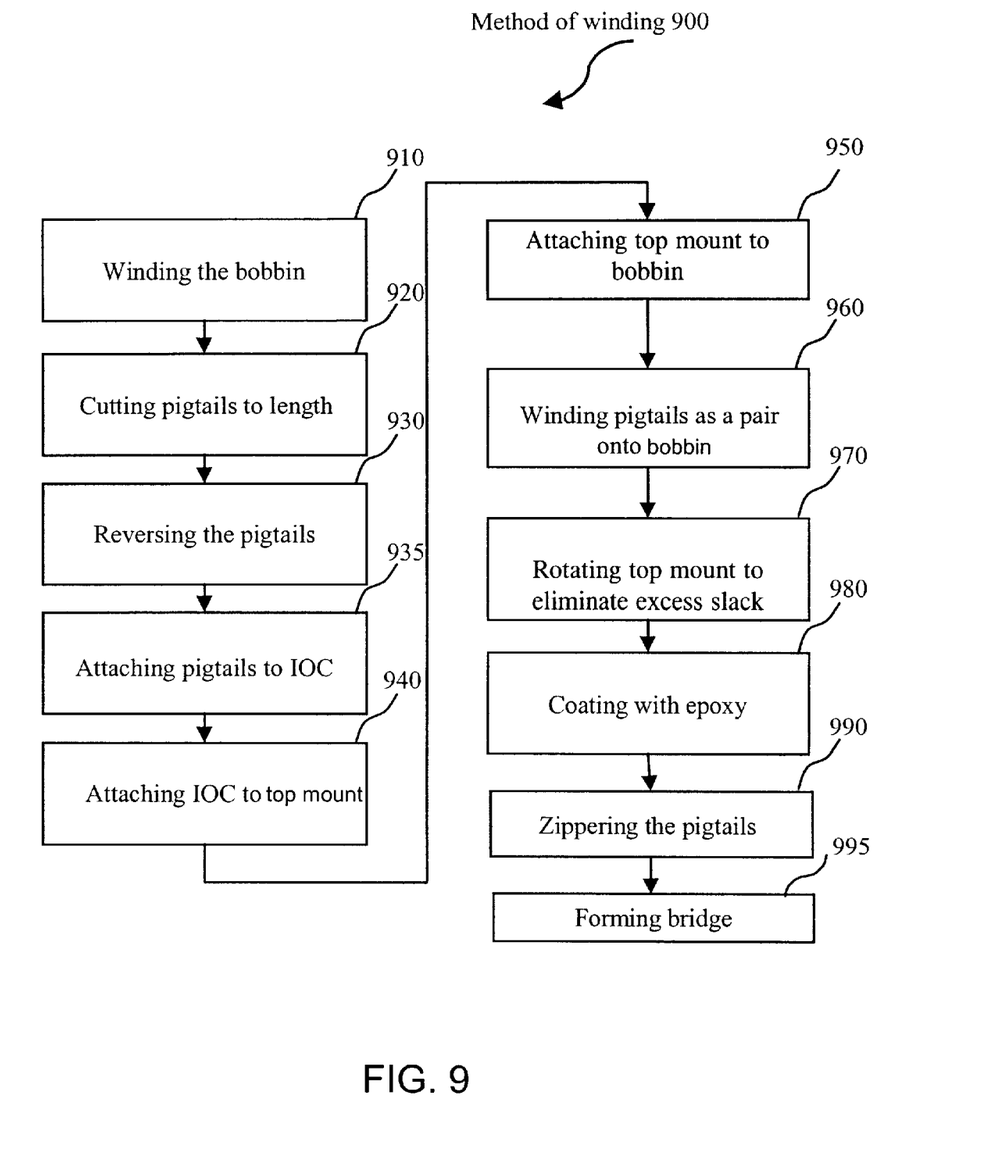
FIG. 9 shows, in flow diagram form, a method of winding and constructing an optical fiber coil assembly according to the present invention.

FIG. 9 shows method 900 of winding and constructing an optical fiber coil assembly. Method 900 includes of the following steps:

Step 910: Winding the Bobbin

In this step, optical fiber 125, beginning at its center, is wound around bobbin 110 forming a plurality of layers of wound fiber 130. The two opposite ends of optical fiber 125 emerge in opposite directions from bobbin 110 as lower pigtail 510 and upper pigtail 520. As each layer of wound fiber 130 is formed during the winding, a thin layer of epoxy coating 230 is applied.

Step 920: Cutting Pigtails to Length

In this step, lower pigtail 510 and/or upper pigtail 520 are cut to specific lengths, typically between one and three meters.

Step 930: Reversing the Pigtails

In this step, lower pigtail 510 is wrapped in a loop to form reversal 195 and falls back alongside upper pigtail 520. The reversal 195 is spot tacked to temporarily hold it in place. It is important to note that the reversal is formed in the lower pigtail because it is impossible to prevent the two pigtails from crossing over if reversal 195 is formed in the upper pigtail 520. Degraded FOG performance results if a crossover occurs between the two pigtails.

Step 935: Attaching Pigtail Ends to IOC

During this step of the process, the pairing of upper pigtail 510 and the portion of lower pigtail 520 after the reversal 195 exit bobbin 110 of wound fiber 130 and are connected to IOC 170 as inputs. The reversal 195 may be adjusted after the pigtails are connected to IOC 170 to ensure that the pigtails are equal in length.

Step 940: Attaching IOC to Top Mount

In this step, IOC 170 is fastened to rotatable top mount 120.

Step 950: Attaching Top Mount to Bobbin

In this step, rotatable top mount 120 is fastened to top flange 140 of bobbin 110. IOC 170 is now the top piece of the FOG assembly, securely fastened to top mount 120, which in turn is fastened to bobbin 110.

Step 960: Winding the Pigtails as a Pair onto Bobbin

Lower pigtail 510 and upper pigtail 520 wind onto bobbin 110 as the pair is held together and top mount 120 is rotated. Rotatably mounted IOC 170 disallows twists from developing in the pigtails as they wind upward just above the formation of reversal 195 onto bobbin 110. As the pigtails wind onto bobbin 110, the pigtails are secured in place with tape and/or a small amount of epoxy.

Step 970: Rotating Spool to Eliminate Excess Slack

In this step, lead pair 180 is made taut by the final rotation of top mount 120, eliminating slack in lead pair 180 between its exit from bobbin 110 and entrance into IOC 170. This step is facilitated easily by the action of rotatable top mount 120 upon which IOC 170 is fastened.

Step 980: Coating with Epoxy

In this step, the exposed portion of wound fiber 130 on bobbin 110 within upper flange 140 and lower flange 150 is coated with a thin layer of epoxy, e.g. Epoxy Technology's Epotek 330.

Step 990: Zippering the Pigtails

During this step, a portion of lead pair 180 is secured together with an epoxy zipper 310, e.g. Norland brand U-V curable epoxy, further stabilizing the arrangement and insuring that lower pigtail 510 and upper pigtail 520 comprising lead pair 180 are exposed to identical environments.

Step 995: Forming Bridge

In this step, an amount of epoxy, e.g. Norland's brand U-V curable epoxy, is applied as a bridge 190 between upper flange 140 and lead pair 180 to lessen the vulnerability of lead pair 180 as it approaches IOC 170.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An optical fiber coil assembly for use in a fiber optic gyroscope, comprising:

a bobbin disposed about a longitudinal axis, wherein the longitudinal axis is an axis of rotation about which the bobbin revolves;

an optical fiber having a first end and a second end, and characterized by an intermediate point between the first end and the second end, wherein a first section of the optical fiber defined from the intermediate point to the first end is wound around the bobbin in a first rotational direction about the axis of rotation, and a second section of the optical fiber defined from the intermediate point to the second end is at least partially wound around the bobbin in a second rotational direction opposite of the first rotational direction;

a reversal of the optical fiber in the second section, such that an end portion of the second section, from the reversal to the second end, is wound around the bobbin in the first direction, along with an end portion of the first section;

an epoxy zipper disposed between at least a portion of the first section and the second section of the optical fiber, so as to join the first section and the second section of the optical fiber to form a fiber lead pair; and, an epoxy bridge disposed between at least a portion of the fiber lead pair and the bobbin, so as to secure the fiber lead pair to the bobbin.

2. An optical fiber coil assembly according to claim 1, further including one or more layers of wound fiber, each of the layers being substantially parallel to the axis of rotation, and an epoxy layer disposed upon the outer portion of each of the one or more layer of wound fiber.

3. An optical fiber coil assembly according to claim 2, wherein the epoxy layer includes a high-modulus epoxy.

4. An optical fiber coil assembly according to claim 2, wherein a group of individual optical fibers are constructed and arranged such that a cross section of the one or more layers of wound fiber are disposed in a hexagonal arrangement.

5. An optical fiber coil assembly according to claim 2, further including an epoxy layer disposed between a first layer of the one or more layers of wound fiber and the bobbin.

6. An optical fiber coil assembly according to claim 1, further including an integrated optics circuit rotatably mounted to an end of the bobbin, such that the integrated optics circuit rotates about the axis of rotation, wherein the first end and the second end of the optical fiber is fixedly attached and optically coupled to the integrated optics circuit.

7. An optical fiber coil assembly according to claim 1, wherein the epoxy zipper extends along the fiber lead pair from the ends of the fiber to the reversal.

8. An optical fiber coil assembly according to claim 1, wherein the reversal is positioned within the fiber such that the end portion of the first section is substantially equal to the end portion of the second section.

9. An optical fiber coil assembly according to claim 1, wherein the epoxy zipper is disposed along opposite sides of the first section and the second section of the optical fiber, such that the first section and the second section of the optical fiber are substantially adjacent.

10. An optical fiber coil assembly according to claim 1, wherein the epoxy zipper is disposed between the first section and the second section of the optical fiber, such that the zipper maintains the first section and the second section of the optical fiber at a fixed distance from one another along the length of the fiber lead pair.

11. An optical fiber coil assembly according to claim 1, wherein the epoxy zipper encapsulates the first section and the second section of the optical fiber and fixedly maintains the first section and the second section with respect to one another along the length of the fiber lead pair.

12. An optical fiber coil assembly for use in a fiber optic gyroscope, comprising:

a bobbin disposed about a longitudinal axis, wherein the longitudinal axis is an axis of rotation about which the bobbin revolves;

an optical fiber having a first end and a second end, and characterized by an intermediate point between the first end and the second end, wherein a first section of the optical fiber defined from the intermediate point to the first end is wound around the bobbin in a first rotational direction about the axis of rotation, and a second section of the optical fiber defined from the intermediate point to the second end is at least partially wound around the bobbin in a second rotational direction opposite of the first rotational direction;

an epoxy zipper disposed between at least a portion of the first section and the second section of the optical fiber, so as to join the first section and the second section of the optical fiber to form a fiber lead pair; and, an epoxy bridge disposed between at least a portion of the fiber lead pair and the bobbin, so as to secure the fiber lead pair to the bobbin.

13. An optical fiber coil assembly according to claim 12, further including one or more layers of wound fiber, each of the layers being substantially parallel to the axis of rotation, and an epoxy layer disposed upon the outer portion of each of the one or more layer of wound fiber.

14. An optical fiber coil assembly according to claim 13, further including an epoxy layer disposed between a first layer of the one or more layers of wound fiber and the bobbin.

15. An optical fiber coil assembly according to claim 13, wherein the epoxy layer includes a high-modulus epoxy.

16. An optical fiber coil assembly according to claim 12, wherein the epoxy zipper extends along the fiber lead pair from the ends of the fiber to the reversal.

17. An optical fiber coil assembly according to claim 12, wherein the reversal is positioned within the fiber such that the end portion of the first section is substantially equal to the end portion of the second section.

18. An optical fiber coil assembly according to claim 12, wherein the epoxy zipper is disposed along opposite sides of the first section and the second section of the optical fiber, such that the first section and the second section of the optical fiber are substantially adjacent.

19. An optical fiber coil assembly according to claim 12, wherein the epoxy zipper is disposed between the first section and the second section of the optical fiber, such that the zipper maintains the first section and the second section of the optical fiber at a fixed distance from one another along the length of the fiber lead pair.

20. An optical fiber coil assembly according to claim 12, wherein the epoxy zipper encapsulates the first section and the second section of the optical fiber and fixedly maintains the first section and the second section with respect to one another along the length of the fiber lead pair.

21. An optical fiber coil assembly for use in a fiber optic gyroscope, comprising:

a bobbin disposed about a longitudinal axis, wherein the longitudinal axis is an axis of rotation about which the bobbin revolves;

an optical fiber having a first end and a second end, and characterized by an intermediate point between the first end and the second end, wherein a first section of the optical fiber defined from the intermediate point to the first end is wound around the bobbin in a first rotational direction about the axis of rotation, and a second section of the optical fiber defined from the intermediate point to the second end is at least partially wound around the bobbin in a second rotational direction opposite of the first rotational direction; and, an integrated optics circuit rotatably mounted to an end of the bobbin, such that the integrated optics circuit rotates about the axis of rotation, wherein the first end and the second end of the optical fiber is fixedly attached and optically coupled to the integrated optics circuit.

22. An optical fiber coil assembly according to claim 21, further including an epoxy zipper disposed between at least a portion of the first section and the second section of the optical fiber, so as to join the first section and the second section of the optical fiber to form a fiber lead pair.

23. An optical fiber coil assembly according to claim 22, wherein the epoxy zipper is disposed along opposite sides of the first section and the second section of the optical fiber, such that the first section and the second section of the optical fiber are substantially adjacent.

24. An optical fiber coil assembly according to claim 22, wherein the epoxy zipper is disposed between the first section and the second section of the optical fiber, such that the zipper maintains the first section and the second section of the optical fiber at a fixed distance from one another along the length of the fiber lead pair.

25. An optical fiber coil assembly according to claim 22, wherein the epoxy zipper encapsulates the first section and the second section of the optical fiber and fixedly maintains the first section and the second section with respect to one another along the length of the fiber lead pair.

26. An optical fiber coil assembly according to claim 22, wherein the epoxy zipper extends along the fiber lead pair from the ends of the fiber to the reversal.

27. An optical fiber coil assembly according to claim 21, further including one or more layers of wound fiber, each of the layers being substantially parallel to the axis of rotation, and an epoxy layer disposed upon the outer portion of each of the one or more layer of wound fiber.

28. An optical fiber coil assembly according to claim 27, further including an epoxy layer disposed between a first layer of the one or more layers of wound fiber and the bobbin.

29. An optical fiber coil assembly according to claim 28, wherein the epoxy layer includes a high-modulus epoxy.

30. An optical fiber coil assembly according to claim 21, further including a reversal of the optical fiber in the second section, such that an end portion of the second section, from the reversal to the second end, is wound around the bobbin in the first direction, along with an end portion of the first section.

31. An optical fiber coil assembly according to claim 30, wherein the reversal is positioned within the fiber such that the end portion of the first section is substantially equal to the end portion of the second section.

32. An optical fiber coil assembly for use in a fiber optic gyroscope, comprising:
a bobbin disposed about a longitudinal axis, wherein the longitudinal axis is an axis of rotation about which the bobbin revolves;
an optical fiber having a first end and a second end, and characterized by an intermediate point between the first end and the second end, wherein a first section of the optical coil defined from the intermediate point to the first end is wound around the bobbin in a first rotational direction about the axis of rotation, and a second section of the optical coil defined from the intermediate point to the second end is at least partially wound around the bobbin in a second rotational direction opposite of the first rotational direction; and,
an epoxy zipper disposed between at least a portion of the first section and the second section of the optical fiber, so as to join the first section and the second section of the optical fiber to form a fiber lead pair.

33. An optical fiber coil assembly according to claim 32, further including one or more layers of wound fiber, each of the layers being substantially parallel to the axis of rotation, and an epoxy layer disposed upon the outer portion of each of the one or more layer of wound fiber.

34. An optical fiber coil assembly according to claim 33, further including an epoxy layer disposed between a first layer of the one or more layers of wound fiber and the bobbin.

35. An optical fiber coil assembly according to claim 33, wherein the epoxy layer includes a high-modulus epoxy.

36. An optical fiber coil assembly according to claim 32, wherein the epoxy zipper extends along the fiber lead pair from the ends of the fiber to the reversal.

37. An optical fiber coil assembly according to claim 32, wherein the reversal is positioned within the fiber such that the end portion of the first section is substantially equal to the end portion of the second section.

38. An optical fiber coil assembly according to claim 32, wherein the epoxy zipper is disposed along opposite sides of the first section and the second section of the optical fiber, such that the first section and the second section of the optical fiber are substantially adjacent.

39. An optical fiber coil assembly according to claim 32, wherein the epoxy zipper is disposed between the first section and the second section of the optical fiber, such that the zipper maintains the first section and the second section of the optical fiber at a fixed distance from one another along the length of the fiber lead pair.

40. An optical fiber coil assembly according to claim 32, wherein the epoxy zipper encapsulates the first section and the second section of the optical fiber and fixedly maintains the first section and the second section with respect to one another along the length of the fiber lead pair.

41. An optical fiber coil assembly according to claim 32, further including an epoxy bridge disposed between at least a portion of the fiber lead pair and the bobbin, so as to secure the fiber lead pair to the bobbin.

42. An optical fiber coil assembly for use in a fiber optic gyroscope, comprising:
a bobbin, disposed about a longitudinal axis, wherein the longitudinal axis is an axis of rotation about which the bobbin revolves;
an optical fiber having a first end and a second end, and characterized by an intermediate point between the first end and the second end, wherein a first section of the optical fiber defined from the intermediate point to the first end is wound around the bobbin in a first rotational direction about the axis of rotation, and a second section of the optical fiber defined from the intermediate point to the second end is at least partially wound around the bobbin in a second rotational direction opposite of the first rotational direction;
a reversal of the optical fiber in the second section, such that an end portion of the second section, from the reversal to the second end, is wound around the bobbin in the first direction, along with an end portion of the first section;
an epoxy zipper disposed between at least a portion of the first section and the second section of the optical fiber, so as to join the first section and the second section of the optical fiber to form a fiber lead pair;
an epoxy bridge disposed between at least a portion of the fiber lead pair and the bobbin, so as to secure the fiber lead pair to the bobbin; and,
an integrated optics circuit rotatably mounted to an end of the bobbin, such that the integrated optics circuit rotates about the axis of rotation, the first end and the second end of the optical fiber being fixedly attached and optically coupled to the integrated optics circuit;

wherein the optical fiber is constructed and arranged as one or more layers of wound fiber, each of the layers being substantially parallel to the axis of rotation, and an epoxy layer is disposed upon the outer portion of each of the one or more layer of wound fiber.

43. A method of constructing an optical fiber coil assembly for use in a fiber optic gyroscope, comprising:

winding an optical fiber about a bobbin, beginning at an intermediate point on the fiber between a first end and a second end and winding a first section of the optical fiber defined from the intermediate point to the first end is wound around the bobbin in a first rotational direction about the axis of rotation, and winding a second section of the optical fiber defined from the intermediate point to the second end is at least partially wound around the bobbin in a second rotational direction opposite of the first rotational direction, wherein the optical fiber is constructed and arranged as one or more layers of wound fiber, each of the layers being substantially parallel to the axis of rotation, and an epoxy layer is disposed upon the outer portion of each of the one or more layer of wound fiber;

providing a reversal of the optical fiber in the second section, such that an end portion of the second section, from the reversal to the second end, is wound around the bobbin in the first direction, along with an end portion of the first section;

applying an epoxy zipper disposed between at least a portion of the first section and the second section of the optical fiber, so as to join the first section and the second section of the optical fiber to form a fiber lead pair;

applying an epoxy bridge disposed between at least a portion of the fiber lead pair and the bobbin, so as to secure the fiber lead pair to the bobbin; and, rotatably mounting an integrated optics circuit to an end of the bobbin, such that the integrated optics circuit rotates about the axis of rotation, the first end and the second end of the optical fiber being fixedly attached and optically coupled to the integrated optics circuit.

44. A method of constructing an optical fiber coil assembly for use in a fiber optic gyroscope, comprising:

winding an optical fiber about a bobbin, beginning at an intermediate point on the fiber between a first end and a second end and winding a first section of the optical fiber defined from the intermediate point to the first end is wound around the bobbin in a first rotational direction about the axis of rotation, and winding a second section of the optical fiber defined from the intermediate point to the second end is at least partially wound around the bobbin in a second rotational direction opposite of the first rotational direction, wherein the optical fiber is constructed and arranged as one or more layers of wound fiber, each of the layers being substantially parallel to the axis of rotation, and an epoxy layer is disposed upon the outer portion of each of the one or more layer of wound fiber; and, applying an epoxy zipper disposed between at least a portion of the first section and the second section of the optical fiber, so as to join the first section and the second section of the optical fiber to form a fiber lead pair.

45. A method of constructing an optical fiber coil assembly according to claim 44, further including applying an epoxy bridge disposed between at least a portion of the fiber lead pair and the bobbin, so as to secure the fiber lead pair to the bobbin.

46. A method of constructing an optical fiber coil assembly according to claim 44, further including rotatably mounting an integrated optics circuit to an end of the bobbin, such that the integrated optics circuit rotates about the axis of rotation, the first end and the second end of the optical fiber being fixedly attached and optically coupled to the integrated optics circuit.

47. A method of constructing an optical fiber coil assembly according to claim 44, further including providing a reversal of the optical fiber in the second section, such that an end portion of the second section, from the reversal to the second end, is wound around the bobbin in the first direction, along with an end portion of the first section.

48. A method of constructing an optical fiber coil assembly, comprising:

winding a length of optical fiber about an axis of rotation of a bobbin;

cutting a pair of ends of the optical fiber to a predetermined length;

reversing one of the fiber ends of the pair so as to form a fiber lead pair;

attaching the fiber ends of the pair to an integrated optical circuit, and attaching the integrated optical circuit to a mounting fixture;

rotatably attaching the mounting fixture to an end of the bobbin, such that the mounting device rotates about the axis of rotation;

winding the fiber lead pair about the bobbin;

rotating the mounting fixture so as to remove excess slack from the fiber lead cable about the bobbin;

coating at least a portion of the optical fiber, the lead pair and the bobbin with an epoxy;

applying an epoxy zipper to the lead pair; and, forming a bridge between the bobbin and the lead pair, so as to secure the lead pair to the bobbin.

49. An optical fiber coil assembly for use in a fiber optic gyroscope, comprising:

an optical fiber having a first end and a second end, and characterized by an intermediate point between the first end and the second end, wherein a first section of the optical coil defined from the intermediate point to the first end is wound around a bobbin in a first rotational direction about the axis of rotation, and a second section of the optical coil defined from the intermediate point to the second end is at least partially wound around the bobbin in a second rotational direction opposite of the first rotational direction;

means for reversing the optical fiber in the second section, such that an end portion of the second section, from the reversal to the second end, is wound around the bobbin in the first direction, along with an end portion of the first section;

means for joining the first section and the second section of the optical fiber to form a fiber lead pair; and, bridging means for bridging at least a portion of the fiber lead pair with respect to the bobbin, so as to secure the fiber lead pair to the bobbin.

* * * * *